(12) United States Patent
Yamada et al.

(10) Patent No.: US 8,373,674 B2
(45) Date of Patent: Feb. 12, 2013

(54) TOUCH SCREEN DEVICE

(75) Inventors: Taichi Yamada, Fukuoka (JP); Masami Hirakawa, Fukuoka (JP); Tatsuhito Ueno, Fukuoka (JP); Yasunobu Hayashida, Fukuoka (JP); Yasuhiro Tasaka, Fukuoka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/463,049

(22) Filed: May 3, 2012

(65) Prior Publication Data

US 2012/0293453 A1    Nov. 22, 2012

(30) Foreign Application Priority Data

May 18, 2011    (JP) .................................. 2011-111105

(51) Int. Cl.
*G09G 5/00* (2006.01)

(52) U.S. Cl. ..................................... 345/173; 178/18.01

(58) Field of Classification Search .......... 345/173–179; 178/18.01–18.11
See application file for complete search history.

(56) References Cited

U.S. PATENT DOCUMENTS

| | | | |
|---|---|---|---|
| 5,790,106 A | * | 8/1998 | Hirano et al. ................. 345/173 |
| 2011/0175842 A1 | * | 7/2011 | Miura ........................... 345/173 |
| 2011/0205172 A1 | | 8/2011 | Kitada |
| 2011/0279408 A1 | | 11/2011 | Urano et al. |
| 2011/0291966 A1 | | 12/2011 | Takao et al. |
| 2011/0298737 A1 | | 12/2011 | Maeda et al. |
| 2012/0013555 A1 | | 1/2012 | Maeda et al. |

FOREIGN PATENT DOCUMENTS

| | | |
|---|---|---|
| JP | 02-109117 | 4/1990 |
| JP | 04-060715 | 2/1992 |

* cited by examiner

*Primary Examiner* — Regina Liang
(74) *Attorney, Agent, or Firm* — Greenblum & Bernstein, P.L.C.

(57) ABSTRACT

A touch screen device includes a panel body having electrodes arranged in a grid pattern; a sensitivity calculator configured to calculate a sensitivity for each electrode intersection based on an amount of change in a signal output from the electrodes in response to a touch operation; a touch position detector configured to detect the touch position based on the sensitivity obtained by the sensitivity calculator; and a pointing device determiner configured to correct the sensitivity obtained by the sensitivity calculator, based on the touch position obtained by the touch position detector, and to determine whether a pointing device performing the touch operation is a pen or a finger, based on the corrected sensitivity.

20 Claims, 12 Drawing Sheets

Fig.6

Sensitivity correction value table

| Actual measured value of sensitivity | 0 | 1 | 2 | 3 | 4 | 5 | 6 | 7 | 8 | 9 |
|---|---|---|---|---|---|---|---|---|---|---|
| Correction value of sensitivity | 0 | 0 | 0 | 2 | 5 | 7 | 9 | 11 | 14 | 16 |
| Actual measured value of sensitivity | 10 | 11 | 12 | 13 | 14 | 15 | 16 | 17 | 18 | 19 |
| Correction value of sensitivity | 18 | 20 | 21 | 23 | 25 | 27 | 28 | 30 | 32 | 33 |
| Actual measured value of sensitivity | 20 | 21 | 22 | 23 | 24 | 25 | 26 | 27 | 28 | 29 |
| Correction value of sensitivity | 35 | 36 | 38 | 39 | 40 | 42 | 43 | 44 | 45 | 47 |
| Actual measured value of sensitivity | 30 | 31 | 32 | 33 | 34 | 35 | 36 | 37 | 38 | 39 |
| Correction value of sensitivity | 48 | 49 | 50 | 51 | 52 | 53 | 54 | 55 | 56 | 57 |
| Actual measured value of sensitivity | 40 | 41 | 42 | 43 | 44 | 45 | 46 | 47 | 48 | 49 |
| Correction value of sensitivity | 58 | 59 | 60 | 60 | 61 | 62 | 63 | 64 | 64 | 65 |
| Actual measured value of sensitivity | 50 | 51 | 52 | 53 | 54 | 55 | 56 | 57 | 58 | 59 |
| Correction value of sensitivity | 66 | 67 | 67 | 68 | 69 | 70 | 70 | 71 | 72 | 72 |
| Actual measured value of sensitivity | 60 | 61 | 62 | 63 | 64 | 65 | 66 | 67 | 68 | 69 |
| Correction value of sensitivity | 73 | 74 | 74 | 75 | 76 | 77 | 77 | 78 | 79 | 79 |
| Actual measured value of sensitivity | 70 | 71 | 72 | 73 | 74 | 75 | 76 | 77 | 78 | 79 |
| Correction value of sensitivity | 80 | 81 | 81 | 82 | 82 | 83 | 84 | 84 | 85 | 85 |
| Actual measured value of sensitivity | 80 | 81 | 82 | 83 | 84 | 85 | 86 | 87 | 88 | 89 |
| Correction value of sensitivity | 86 | 87 | 87 | 88 | 88 | 89 | 90 | 90 | 91 | 91 |
| Actual measured value of sensitivity | 90 | 91 | 92 | 93 | 94 | 95 | 96 | 97 | 98 | 99 |
| Correction value of sensitivity | 92 | 93 | 93 | 94 | 95 | 96 | 96 | 97 | 97 | 97 |

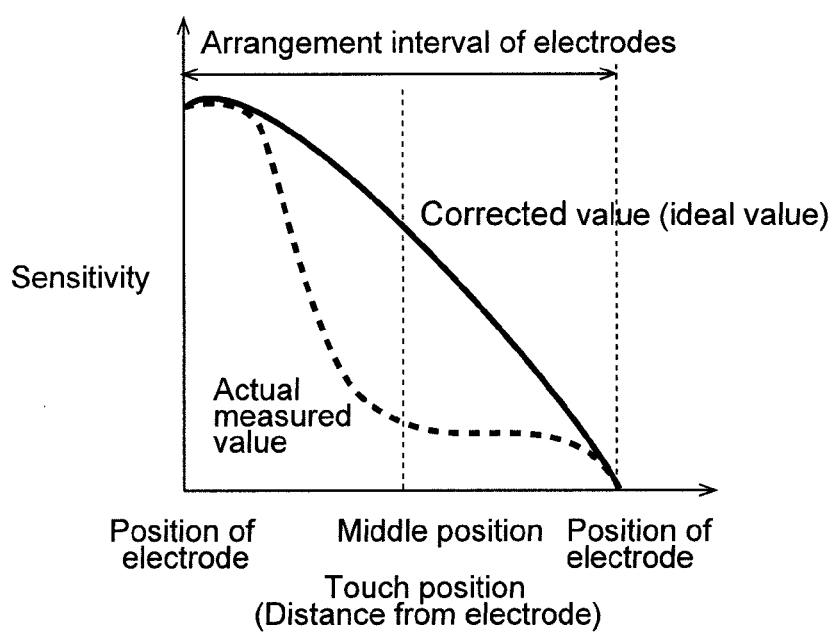

Correction coefficient table

| Position | X0 | X1 | X2 | X3 | X4 | X5 | X6 | X7 | X8 | X9 | X10 |
|---|---|---|---|---|---|---|---|---|---|---|---|
| Y0 | 100 | 100 | 100 | 105 | 111 | 111 | 117 | 120 | 127 | 125 | 127 |
| Y1 | 100 | 100 | 100 | 103 | 105 | 115 | 113 | 125 | 122 | 120 | 122 |
| Y2 | 100 | 100 | 101 | 105 | 109 | 113 | 117 | 122 | 125 | 122 | 130 |
| Y3 | 103 | 105 | 109 | 111 | 113 | 117 | 120 | 125 | 125 | 127 | 127 |
| Y4 | 111 | 109 | 111 | 113 | 117 | 120 | 122 | 125 | 133 | 127 | 133 |
| Y5 | 115 | 113 | 115 | 117 | 122 | 125 | 127 | 130 | 136 | 133 | 130 |
| Y6 | 117 | 120 | 117 | 117 | 125 | 130 | 127 | 127 | 130 | 136 | 139 |
| Y7 | 122 | 125 | 122 | 125 | 127 | 133 | 133 | 133 | 136 | 133 | 136 |
| Y8 | 127 | 125 | 125 | 130 | 130 | 127 | 133 | 136 | 136 | 139 | 136 |
| Y9 | 127 | 127 | 125 | 125 | 130 | 130 | 133 | 136 | 136 | 133 | 139 |
| Y10 | 127 | 125 | 125 | 127 | 127 | 130 | 133 | 136 | 136 | 136 | 136 |

Fig.12

Arrangement interval of electrodes

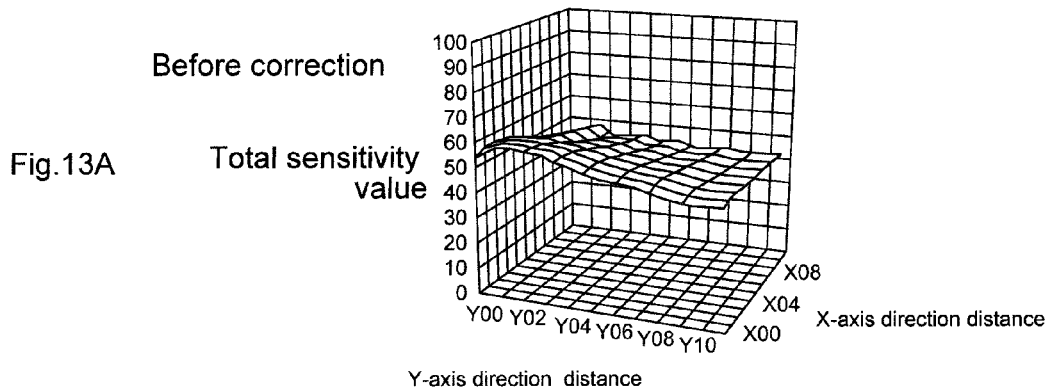
Fig.13A  Before correction  Total sensitivity value
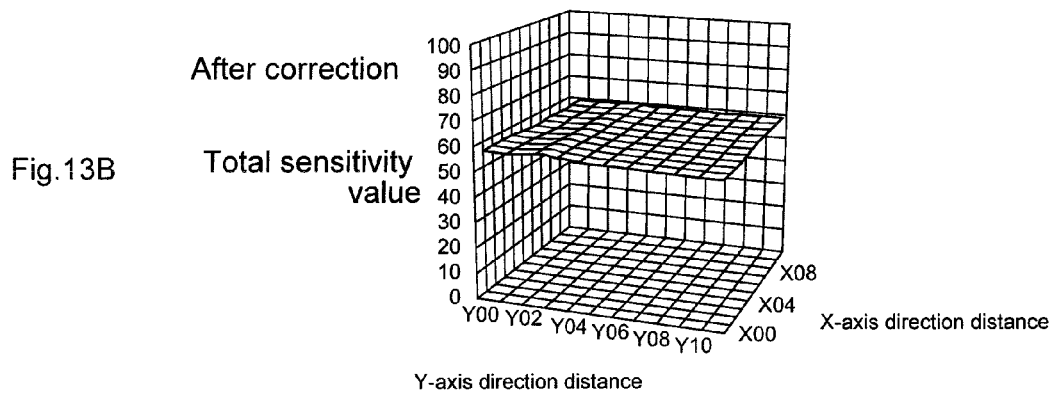
Fig.13B  After correction  Total sensitivity value
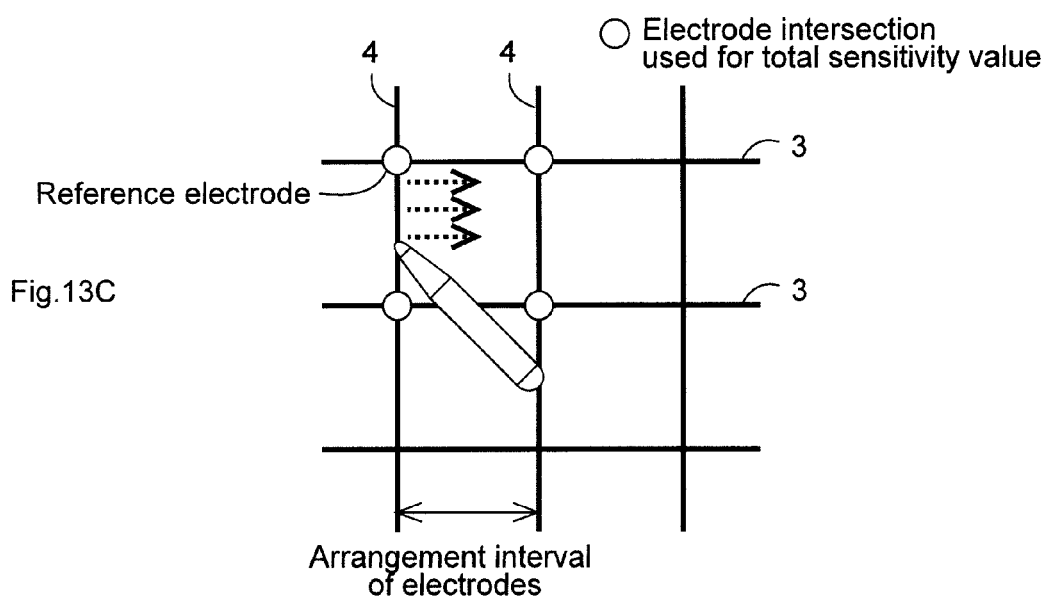
Fig.13C

TOUCH SCREEN DEVICE

CROSS-REFERENCE TO RELATED APPLICATIONS

The present application claims priority under 35 U.S.C. §119 of Japanese Application No. 2011-111105, filed on May 18, 2011, the disclosure of which is expressly incorporated by reference herein in its entirety.

BACKGROUND OF THE INVENTION

1. Field of the Invention

The present invention relates to a touch screen device that determines whether a pointing device for a touch operation is a pen or a finger.

2. Description of Related Art

A touch screen device is widely used in the fields of personal computers or handheld terminals. In addition, the touch screen device can be used as an interactive white board, by combining the touch screen device with a large screen display device, to be used in a presentation or a lecture for a large audience. In particular, such a use of the touch screen device is expected in the educational field, such as a school.

There are various touch screen devices that employ different principles to detect a touch position. For example, in a capacitive touch screen device, in which a plurality of electrodes are arranged in a panel to detect a change in capacitance in response to a touch operation with a pointing device, such as a finger, or the like, an amount of calculation necessary to obtain a touch position increases, as the number of electrodes increases. In particular, when the touch screen device is used as an interactive white board, the number of electrodes increases as the size of the touch screen device increases. Thus, the amount of calculation necessary to obtain a touch position increases by a large amount.

When the processing capacity of a controller is insufficient to handle such an increase in the amount of calculation, a detection process of a touch position cannot follow touch operations using a pointing device, such as a finger. Accordingly, for example, operation feeling may be deteriorated in a handwriting mode, in which a line is drawn along a trajectory of the pointing device when a user moves the pointing device. In view of such a situation, a controller having a high processing capacity may be employed. However, this increases a manufacturing cost significantly, and there is a limit to acceleration of the processing speed.

The calculation load of the controller may be reduced by increasing an arrangement interval between electrodes to reduce the number of electrodes. However, in a process to detect a touch position, the touch position is detected based on the change in signals output from the electrodes in response to a touch operation. The amount of change in the signals decreases as the distance between the touch position and the electrode increases. Accordingly, when the arrangement interval between electrodes increases, an accuracy of detection of touch position may be reduced. In view of this, a technology is known that increases the accuracy of the detection of the touch position by correcting the amount of change in signals in response to a touch operation (Related Art 1).

Further, when different properties (or functions), such as a color of drawing and the like, are set for a pen and a finger, such that the pen and the finger can be used in different manners, convenience can be improved. In order to do so, however, it is necessary to determine whether the pointing device used in a touch operation is a pen or a finger. With respect to the determination of the pointing device, a technology is known in which a pen is discriminated from a finger according to a contact area of a pointing device on a touch surface (Related Art 2).

However, when the amount of change in signals in response to a touch operation is extremely small due to a large distance between the touch position and an electrode resulting from increasing the arrangement interval between electrodes, an accuracy of determination of the pointing device is reduced. In particular, when a touch screen device is used as an interactive white board, the arrangement interval between electrodes should be significantly large relative to the finger size, and thus, it is difficult to secure the accuracy of determination of pointing device.

Related Art 1: Japanese Patent Application Publication No. 2-109117

Related Art 2: Japanese Patent Application Publication No. 4-60715

SUMMARY OF THE INVENTION

In view of the above-described circumstances, the present invention provides a touch screen device that can secure or maintain the accuracy of a pointing device determining process, which determines whether the pointing device used in a touch operation is a pen or a finger, even if the arrangement or spacing interval between electrodes is large.

An aspect of the present invention provides a touch screen device including: a panel body having electrodes arranged in a grid pattern; a sensitivity calculator configured to calculate a sensitivity for each electrode intersection based on an amount of change in a signal output from the electrodes in response to a touch operation; a touch position detector configured to detect the touch position based on the sensitivity obtained by the sensitivity calculator; and a pointing device determiner configured to correct the sensitivity obtained by the sensitivity calculator, based on the touch position obtained by the touch position detector, and to determine whether a pointing device performing the touch operation is a pen or a finger, based on the corrected sensitivity.

According to the aspect of the present invention, since the sensitivity is corrected according to a touch position, it is possible to securely determine the pointing device, regardless of whether or not the touch position is spaced from the electrode. Accordingly, even if the arrangement interval of the electrodes is large, the accuracy of determination of a pointing device can be secured or maintained.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 6 is a sensitivity correction value table, which is used in a first sensitivity correction process;

FIG. 7 is a diagram illustrating states of change in sensitivity according to a touch position before and after the correction;

FIG. 11 is a correction coefficient table, which is used in a second sensitivity correction process;

FIG. 12 is a diagram illustrating a region for which correction coefficients are prepared in the correction coefficient table;

FIGS. 13A and 13B are diagrams respectively illustrating states of change in the total sensitivity value according to a touch position before and after the correction;

FIG. 13C is a diagram illustrating a process to obtain the state of change in the total sensitivity value;

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Embodiments of the present invention will be described hereinafter with reference to the drawings.

Figure 1:
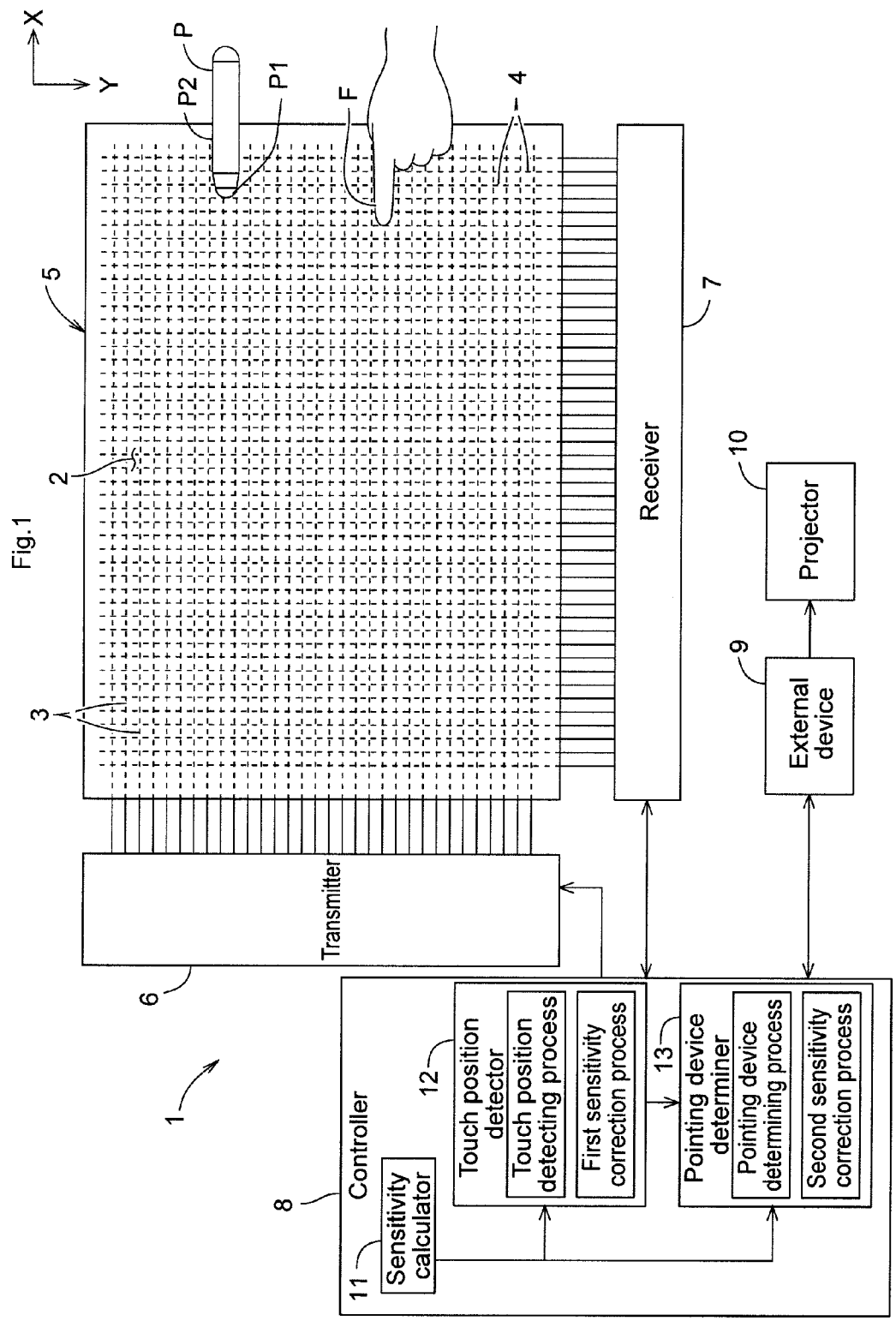
FIG. 1 is a configuration diagram illustrating an entire touch screen device according to an embodiment of the present invention.

FIG. 1 is a configuration diagram illustrating an entire touch screen device according to an embodiment of the present invention. The touch screen device 1 includes a panel body 5, which is provided with a touch surface 2, on which a touch operation by a pen P or a finger F is performed, and in which a plurality of transmitting electrodes 3 extending in parallel to one another and a plurality of receiving electrodes 4 extending in parallel to one another are arranged in a grid pattern; a transmitter 6 that applies a drive signal to the transmitting electrodes 3; a receiver 7 that receives a response signal of the receiving electrodes 4 in response to the drive signal applied to the transmitting electrodes 3, and outputs detection data of each electrode intersection, at which the transmitting electrode 3 intersects with the receiving electrode 4; and a controller 8 that detects a touch position based on the detection data output from the receiver 7, and controls operations of the transmitter 6 and the receiver 7.

The touch screen device 1, combined with a large screen device, is used as an interactive white board, which can be used in a presentation or a lecture. In particular, in this embodiment, the touch screen device 1 is used in combination with a projector device 10, and a touch surface 2 of the touch body 5 is used as a screen that displays a projection image of the projector device 10.

Touch position information output from the controller 8 is input to an external device 9, such as a personal computer, etc. Display screen data generated by the external device 9 is output to the projector device 10. Therefore, an image corresponding to a user's touch operation performed on the touch surface 2 of the touch body 5, using a pointing device (a finger F or a pen P), is displayed on the touch surface 2. Thus, a desired image can be displayed in a feeling similar to when the image is directly drawn on the touch surface 2 by a marker. Further, a button displayed on the display screen can be operated. Moreover, an eraser, which erases the image drawn through a touch operation, can also be used.

The transmitting electrodes 3 extend in an x-axis direction, and are arranged at predetermined intervals in a y-axis direction. The receiving electrodes 4 extend in the y-axis direction and are arranged at predetermined intervals in the x-axis direction. The transmitting electrodes 3 and the receiving electrode 4 are arranged at a constant arrangement interval (e.g., 20 mm), which is wider than an average width of a finger, and the numbers thereof vary according to an aspect ratio of the panel body 5. For example, sixty (60) transmitting electrodes 3 and ninety six (96) receiving electrodes 3 can be provided.

The transmitting electrodes 3 and the receiving electrodes 4 overlap each other with an insulating layer sandwiched therebetween, and intersect with each other. A capacitor is formed at an electrode intersection at which the transmitting electrode 3 intersects with the receiving electrode 4. When a user performs a touch operation with a pointing device (a pen P or a finger F), and thereby the pointing device is positioned close to or contacts the touch surface 2, capacitance at the electrode intersection is substantially reduced in response to the touch operation, and thereby it is possible to detect whether or not a touch operation is performed.

In this embodiment, a mutual capacitance touch screen device is used. Thus, when a drive signal is applied to the transmitting electrode 3, a charge-discharge current flows in the receiving electrode 4 in response to the drive signal. The charge-discharge current is output from the receiving electrode 4, as a response signal. At this moment, when capacitance at an electrode intersection changes in response to a user's touch operation, the charge-discharge current in the receiving electrode 4, i.e., the response signal, also changes. The touch position is calculated based on an amount of change in the response signal. In the mutual capacitance touch screen device, since the detection data obtained by signal processing the response signal at the receiver 7 is output for each electrode intersection between the transmitting electrode 3 and the receiving electrode 4, it is possible to perform multi-touch (or multipoint detection), which detects a plurality of touch positions simultaneously.

The controller 8 includes a sensitivity calculator 11 that calculates a sensitivity of each electrode intersection based on an amount of change in the output signal from the receiving electrode 4 in response to a touch operation; a touch position detector 12 that calculates a touch position based on the sensitivity obtained by the sensitivity calculator 11; and a pointing device determiner 13 that determines whether the pointing device performing the touch operation is a pen P or a finger F, based on the sensitivity obtained by the sensitivity calculator 11.

The sensitivity calculator 11 calculates an amount of change in detection data output from the receiver 7 in response to a touch operation. In other words, the sensitivity calculator 11 calculates a sensitivity of each electrode intersection, which is a difference between the detected data output from the receiver 7 and the detected data obtained in advance in a state, such as, at start-up, in which a touch operation is not performed.

The touch position detector 12 obtains a touch position using a predetermined calculation process based on the sensitivity of each electrode intersection obtained by the sensitivity calculator 11. The touch position detection process is performed every frame period, in which reception of the detection data of each electrode intersection completes over the entire touch surface 2, and touch position information is output to the external device 9 in frame units. The external device 9 generates display screen data in which the touch positions are connected in time series based on the touch position information of a plurality of temporally successive frames, and outputs the display screen data to the projector device 10. In a multi-touch, touch position information including multiple touch positions with pointing devices is output in frame units.

The pointing device determiner 13 discriminates a pen P from a finger F depending on the sensitivity obtained by the sensitivity calculator 11, which is different between the pen P and the finger F. A contact area on the touch surface 2 is different between the pen P and the finger F. Therefore, the sensitivity of the finger F, having a greater contact area, is greater than the sensitivity of the pen P. Thus, it is possible to discriminate the pen P from a finger, based on the difference in the sensitivity.

The pen P has a pen tip portion P1, which is pressed to the touch surface 2 of the panel body 5 at the time of a touch operation, and a grip portion P2, which is held by a user's hand. The pen tip portion P1 and the grip portion P2 are both made of a conductive material and are electrically connected to each other. When the user holds the pen P, the pen tip portion P1 becomes electrically connected with a human body via the grip portion P2. When the user performs a touch operation with the pen P, the capacitance of the electrode intersections changes in a similar manner as a case when touch performed with a finger F, and thus, the touch operation can be detected.

The pen P and the finger F can be used differently from one another by setting mutually different properties (e.g., drawing color in a handwriting mode). The properties set for each of the pen P and the finger F may be specified by a user's operation of a setting button (not shown), which is provided in the touch screen device 1.

The pen P can be a stylus pen, simply made of a conductive material, as well as an electronic pen, in which an electronic component is included. In particular, when an operation switch for setting the properties by a user, and a circuit that transmits the property information to the controller 8 are provided, it is possible to switch the properties with the pen P. Further, when a circuit that transmits identification information of the pen P is provided, a plurality of pens P can be used differently from one another by setting different properties to each pen.

Figure 2:
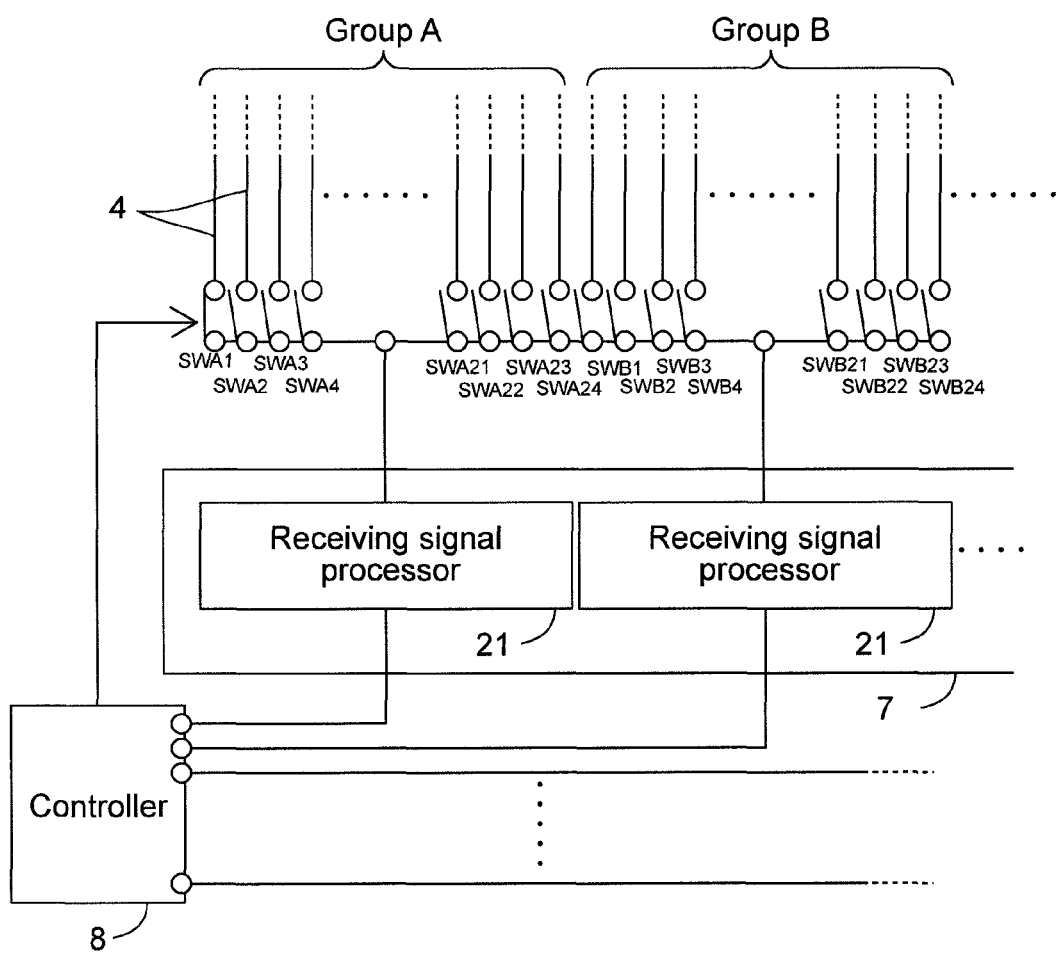
FIG. 2 is a schematic configuration diagram illustrating receiving electrodes and a receiver.

FIG. 2 is a schematic configuration diagram illustrating the receiving electrodes 4 and the receiver 7. Each receiving electrode 4 is connected to a switching element SW, that switches ON and OFF an input of the charge-discharge current signal from the receiving electrode 4 to the receiver 7. The receiver 7 includes a receiving signal processor 21 that performs desired signal processing to the charge-discharge current signal input from the receiving electrode 4 via the switching element SW. ON-OFF control is independently performed for each switching element SW, in accordance with a drive signal from the controller 8.

The receiving electrodes 4 and the switching elements SW are grouped together every predetermined number (e.g., 24), and ON-OFF control of corresponding switching elements SW included in respective groups is concurrently performed. Further, the receiving signal processor 21 is provided for each group. In each group, the switching elements SW are controlled to be turned ON one by one. The rest of the switching elements SW are controlled to remain OFF. The charge-discharge current signal of the single receiving electrode 4, selected by turning ON the corresponding switching element SW, is input to the receiving signal processor 21.

Thus, since the switching operations of the switching elements SW are concurrently performed for the plurality of groups, a period of time necessary to receive the charge-discharge current signals from all of the receiving electrodes 4 can be reduced. Further, since the processing of the charge-discharge current signals at the receiver 7 can be individually performed for each group, an increase in size of the hardware configuration can be reduced.

Figure 3:
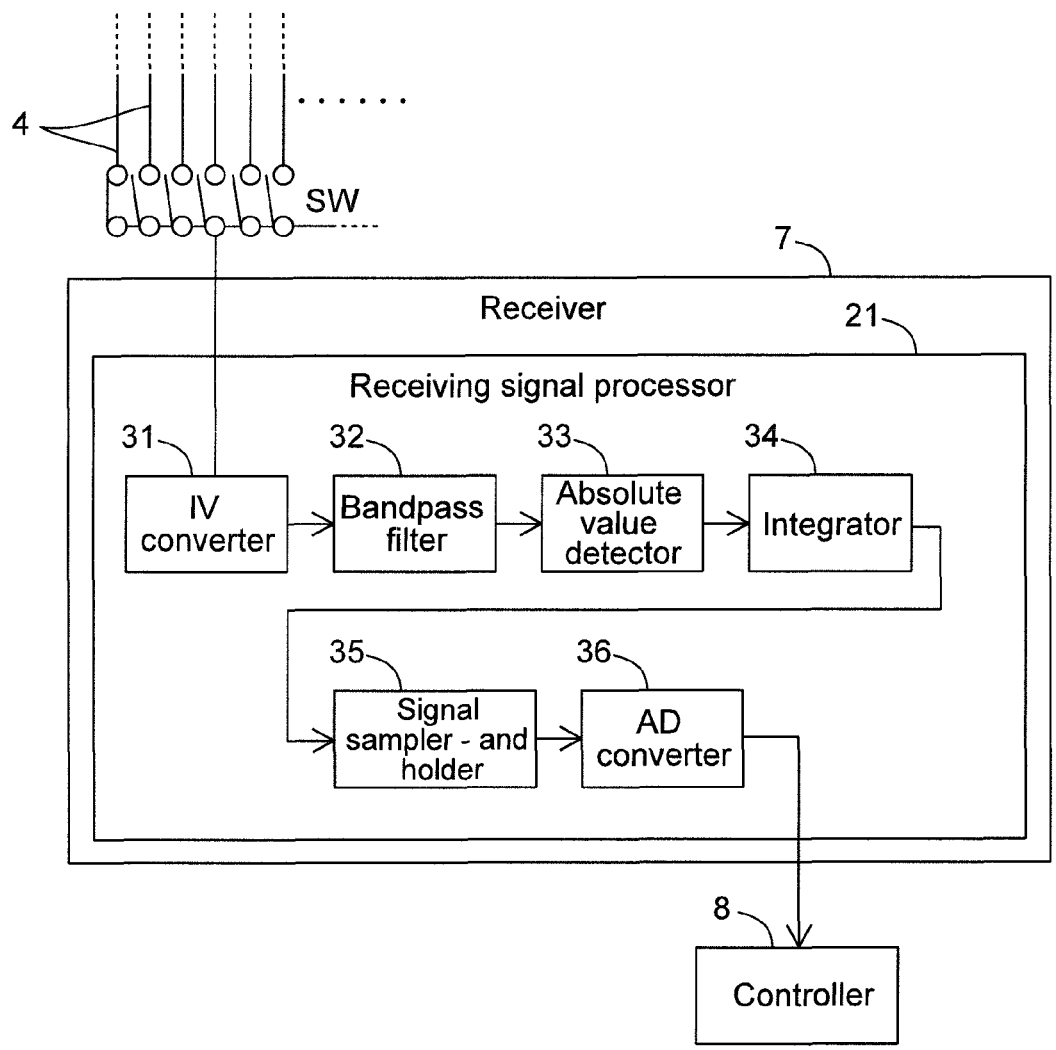
FIG. 3 is a schematic configuration diagram illustrating a receiving signal processor.

FIG. 3 is a schematic configuration diagram illustrating the receiving signal processor 21. The receiving signal processor 21 includes an IV converter 31, a bandpass filter 32, an absolute value detector 33, an integrator 34, a signal sampler-and-holder 35 and an AD converter 36.

The IV converter 31 converts the charge-discharge current signal (analog signal) of the receiving electrode 4, input through the switching elements SW, into a voltage signal. The bandpass filter 32 performs an operation to remove a signal having a frequency component other than the frequency of the drive signal applied to the transmitting electrode 3, from the output signals from the IV converter 31. The absolute value detector (rectifier) 33 applies a full-wave rectification to the output signals from the bandpass filter 32. The integrator 34 performs an operation to integrate the output signal from the absolute value detector 33 along the time axis. The signal sampler-and-holder 35 performs an operation to sample the output signal from the integrator 34 at a predetermined time. The AD converter 36 performs an AD conversion of the output signal from the signal sampler-and-holder 35, and outputs detection data (a level signal).

(Touch Position Detection Process and First Sensitivity Correction Process)

Next, a touch position detection process to detect a touch position of a pointing device, and a first sensitivity correction process to improve an accuracy of the touch position detection process, will be described hereinafter. Both processes are performed by the touch position detector 12.

Figure 4:
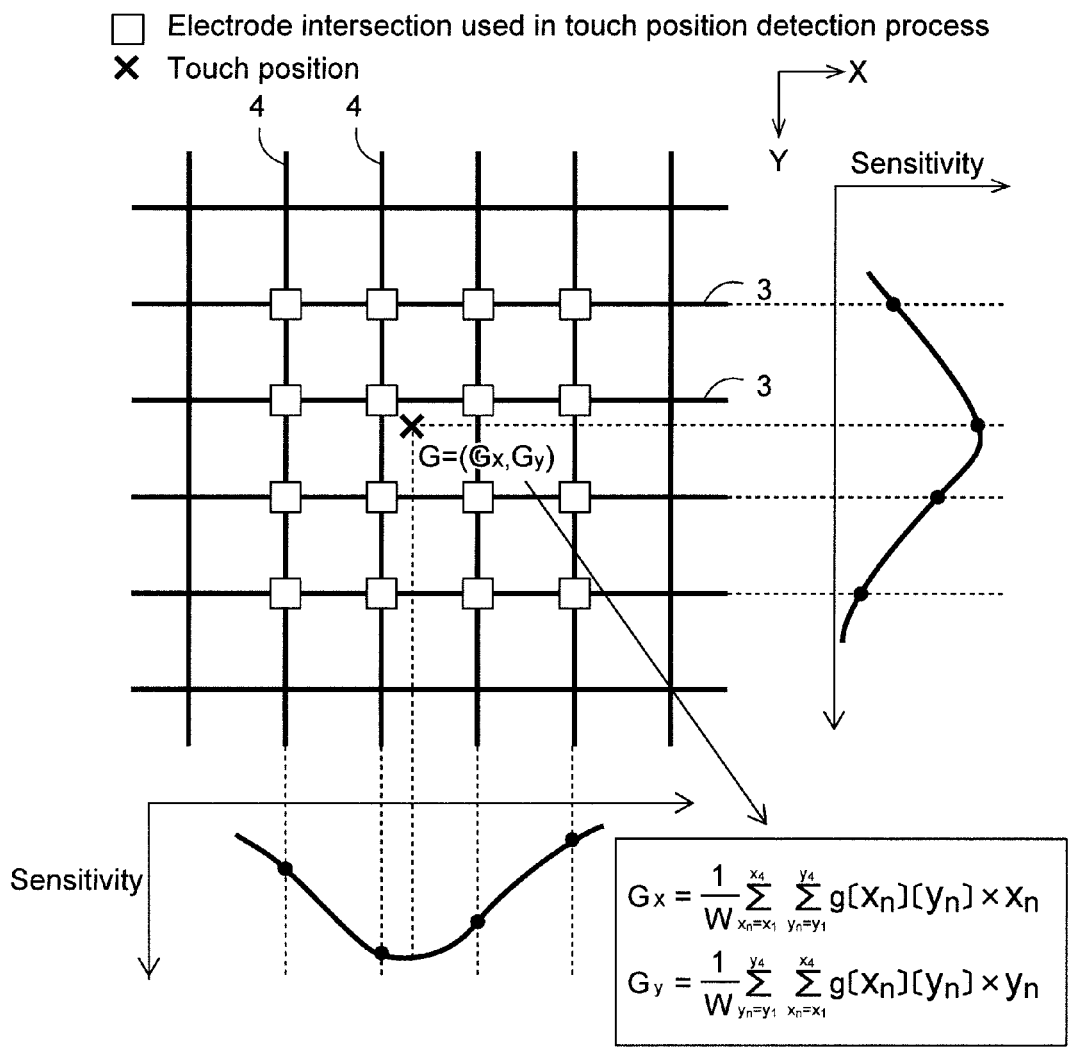
FIG. 4 is a schematic diagram illustrating a touch position detection process performed by a touch position detector.

FIG. 4 is a schematic diagram illustrating a touch position detection process performed by the touch position detector 12. The touch position detector 12 calculates a touch position by using a desired interpolating method based on the sensitivity for each electrode intersection obtained by the sensitivity calculator 11 and a position (coordinate) of each electrode intersection. Thus, it is possible to detect a touch position with a resolution (e.g., equal to or less than 1 mm) that is higher than the arrangement interval (20 mm) of transmitting electrodes 3 and the receiving electrodes 4.

In particular, in this embodiment, a touch position is calculated based on the sensitivity of 4×4 electrode intersections (sixteen (16) electrode intersections in total), in which four (4) electrode intersections are arranged in each of the x-axis direction and in the y-axis direction. Further, in the calculation of the touch position, a centroid method is used, in which the sensitivity of each electrode intersection is regarded as a density, and the touch position is obtained as a position of a center of gravity, which is the center of mass distribution. The position Gx in the x-axis direction and position Gy in the y-axis direction of the gravity center G are obtained by using the equation shown in FIG. 4, where $g[x_n][y_n]$ is a sensitivity of each electrode intersection.

Figure 5A:
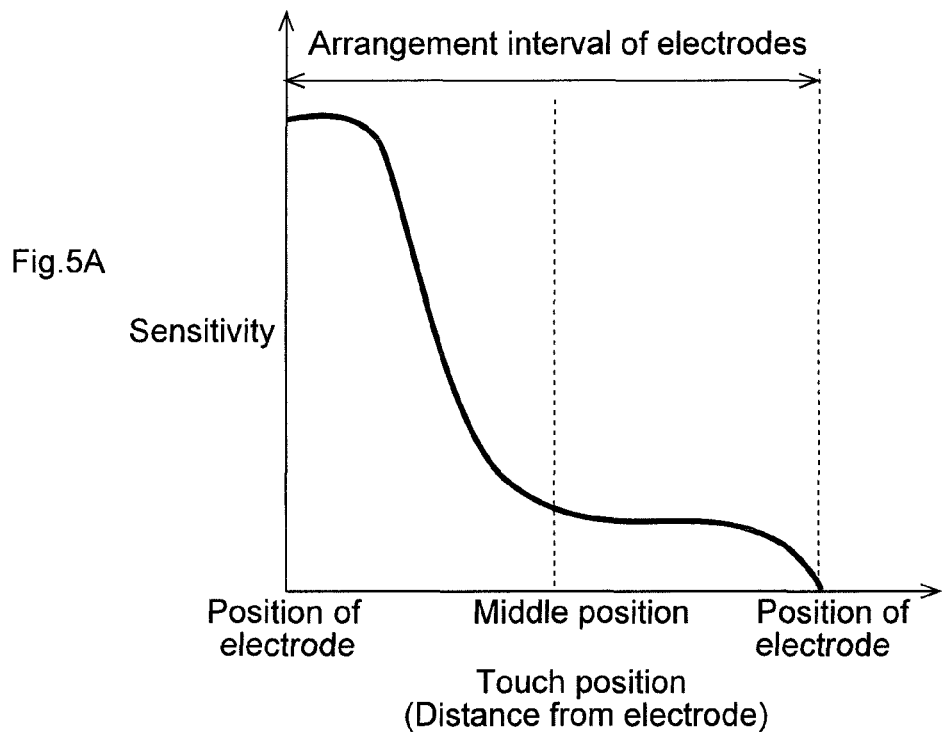
FIG. 5A is a diagram illustrating a state of change in sensitivity according a touch position.
Figure 5B:
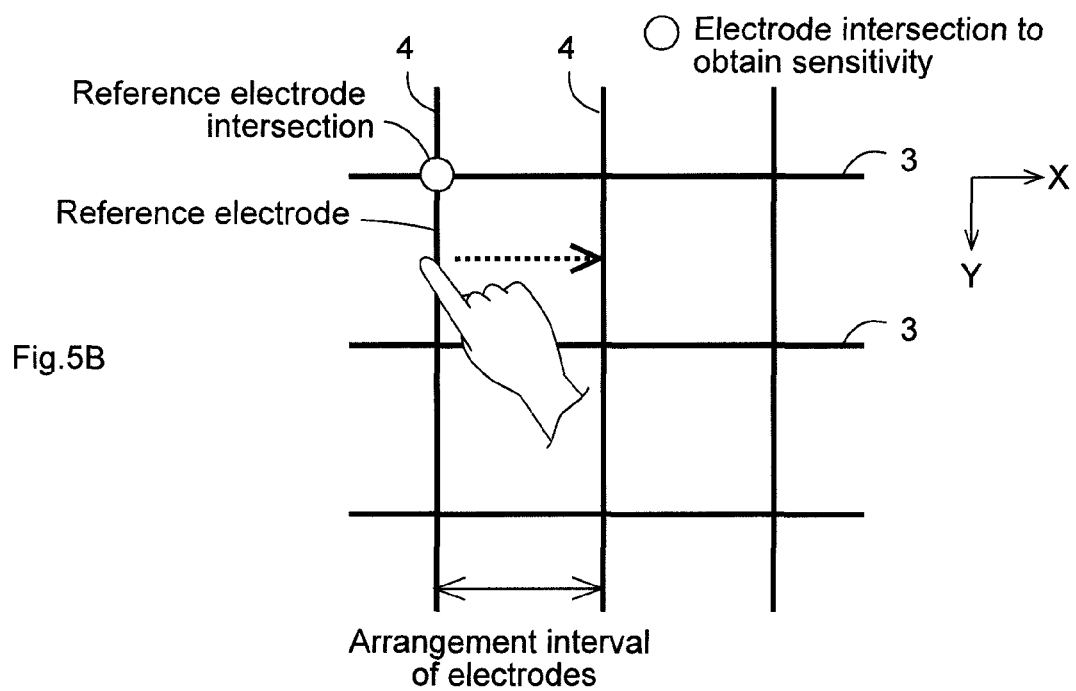
FIG. 5B is a diagram illustrating a process to obtain the state of change in sensitivity.

FIG. 5A is a diagram illustrating a state of change in sensitivity according a touch position (distance from an electrode) with a finger F, and FIG. 5B is a diagram illustrating a process to obtain the state of change in sensitivity. In this embodiment, the arrangement interval of the transmitting electrodes 3 and the receiving electrodes 4 is greater than the finger F.

As shown in FIG. 5B with a dotted arrow, while the finger F is moved from the receiving electrode 4 as a reference (hereinafter, "reference receiving electrode") to an adjacent receiving electrode 4 at predetermined intervals (1 mm), detection data of the electrode intersection as a reference (hereinafter, "reference electrode intersection") is obtained, and the sensitivity is obtained based on the detection data. In this way, a diagram of a sensitivity characteristic according to touch positions is obtained.

As shown in the diagram in FIG. 5A, the sensitivity decreases as the touch position moves away from the reference receiving electrode 4. In particular, the sensitivity abruptly decreases just before the middle position between two receiving electrodes 4, and then remains generally unchanged. Thus, the sensitivity is not proportional to the touch position (distance from the electrode). Accordingly, if the sensitivity of each electrode intersection obtained by the sensitivity calculator 11 is used as it is, the accuracy of the touch position detection process decreases.

When the arrangement interval of the transmitting electrodes 3 and the receiving electrodes 4 is small, only a region in which the sensitivity abruptly decrease occurs, but a region in which the sensitivity remains reduced and unchanged does not occur. Accordingly, a change in sensitivity according to a touch position is large, and the accuracy of the touch position detection process does not decrease. On the other hand, when the arrangement interval of the transmitting electrodes 3 and the receiving electrodes 4 is large, a region in which the sensitivity remain unchanged occurs. In this region, the change in sensitivity according to a touch position is small, and thus, the accuracy of the touch position detection process decreases.

Accordingly, in this embodiment, as described below in detail, the touch position detector 12 performs the first sensitivity correction process, which corrects the sensitivity obtained by the sensitivity calculator 11 to be an ideal sensitivity corresponding to a touch position. The touch position detection process is performed based on the corrected sensitivity, which is obtained through the sensitivity correction process.

Figure 8:
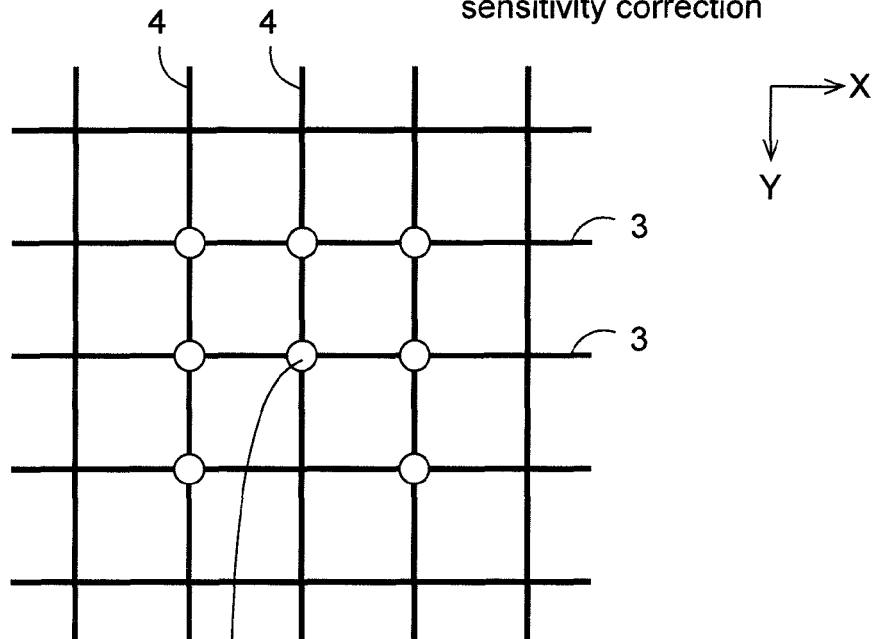
FIG. 8 is a diagram illustrating the first sensitivity correction process.

FIG. 6 is a sensitivity correction value table, which is used in the first sensitivity correction process. FIG. 7 is a diagram illustrating states of change in sensitivity according to a touch position with a finger F (distance from an electrode) before and after the correction. FIG. 8 is a diagram illustrating the first sensitivity correction process.

The touch position detector 12 corrects the sensitivity with reference to the sensitivity correction value table shown in FIG. 6. In the sensitivity correction value table, a correction value is set for each actual measured value of sensitivity. The sensitivity is corrected by replacing the actual measured value of sensitivity obtained by the sensitivity calculator 11 by a corresponding correction value.

The sensitivity correction value table corrects the sensitivity characteristic indicating an abruptly dropping and unchanging state, as shown in FIG. 7 with a broken line, into an ideal sensitivity characteristic, which changes generally linearly according to the touch position, as shown in FIG. 7 with a solid line. As shown in FIG. 6, a correction amount is small in a region in which the actual measured value of sensitivity is large or small, and the correction amount is large in a region in which the actual measured value of sensitivity is medium.

When the sensitivity correction value table is prepared, similarly to the example shown in FIG. 5B, while a dummy finger having a predetermined size for simulation is moved from the reference receiving electrode 4 to an adjacent receiving electrode 4 at predetermined intervals (1 mm), detection data of a reference electrode intersection is obtained, and an actual measured value of sensitivity is obtained for each touch position. The characteristic shown in FIG. 7 with a broken line indicates the actual measured value of sensitivity. Further, an ideal value of sensitivity is calculated for each touch position. The characteristic shown in FIG. 7 with a solid line indicates the ideal value of sensitivity. Then, the actual measured value and the ideal value of the sensitivity are compared for each touch position, and the ideal value corresponding to the actual measured value is set as a correction value in the sensitivity correction value table.

Moreover, in the first sensitivity correction process, as shown in FIG. 8, sensitivities of the electrode intersection having the maximum sensitivity and of a plurality of electrode intersections therearound, are corrected. In particular, in this embodiment, the sensitivities of 3×3 electrode intersections (nine (9) electrode intersections in total), which includes the electrode intersection having the maximum sensitivity as a center, and in which three (3) electrode intersections are arranged in each of the x-axis direction and in the y-axis direction, are corrected.

After the first sensitivity correction process is performed as described above, as shown in FIG. 4, the touch position detection process is performed based on the sensitivities of the 4×4 electrode intersections (sixteen (16) electrode intersections in total). In this case, the sensitivity is maximum at the electrode intersection that is closest to the touch position, and the sensitivities of nine (9) electrode intersections, including the electrode intersection having the maximum sensitivity as a center, are corrected. The sixteen (16) electrode intersections, which are used in the touch position detection process, include the nine (9) electrode intersections processed in the first sensitivity correction process.

As described above, in this embodiment, only the sensitivities of the electrode intersection having the maximum sensitivity and the electrode intersections therearound are corrected. However, sensitivities of all electrode intersections can be corrected, although correction of only the sensitivities of the electrode intersections positioned in the vicinity of the touch position is sufficient to improve the accuracy of the touch position detection process, and this reduces the processing load of the controller 8.

(Pointing Device Determining Process and Second Sensitivity Correction Process)

Next, a pointing device determining process that determines whether the pointing device to perform the touch operation is a pen P or a finger F, and a second sensitivity correction process that improves the accuracy of the pointing device determining process, will be described hereinafter. Both processes are performed by the pointing device determiner 13.

Figure 9:
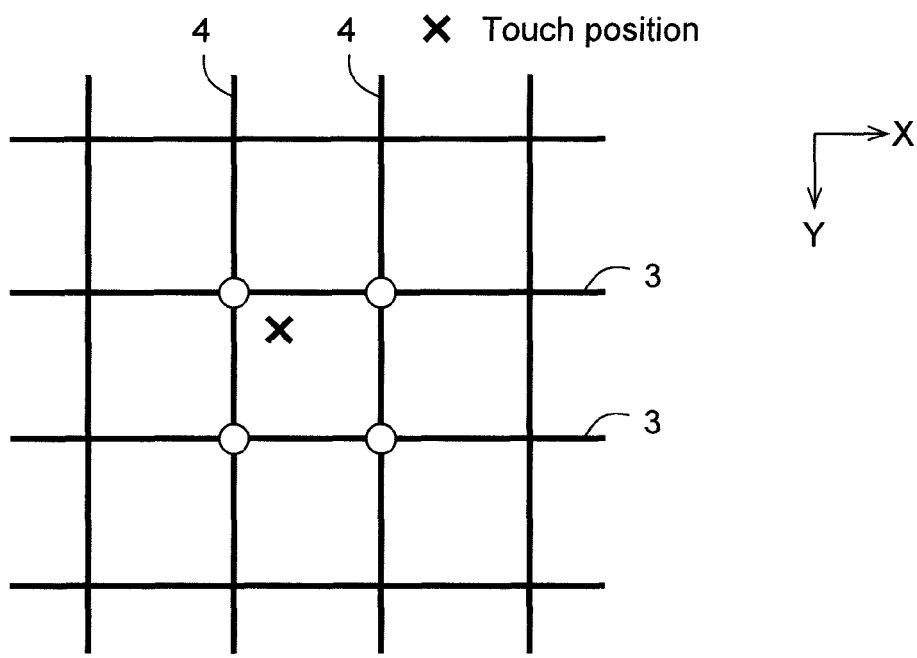
FIG. 9 is a schematic diagram illustrating a pointing device determining process performed by a pointing device determiner.

FIG. 9 is a schematic diagram illustrating a pointing device determining process performed by a pointing device determiner 13. The pointing device determiner 13 determines the pointing device based on the sensitivities of a plurality of electrode intersections positioned in the vicinity of the touch position obtained by the touch position detector 12. In particular, in this embodiment, a total sensitivity value is obtained by adding sensitivities of 2×2 electrode intersections (four (4) electrode intersections in total), in which two (2) electrode intersections are arranged in each of the x-axis direction and in the y-axis direction, such that the touch position is sandwiched therebetween. The total sensitivity value is compared with a predetermined threshold value. When the total sensitivity value is greater than the threshold value, it is determined as a finger F. When the total sensitivity value is smaller than the threshold value, it is determined as a pen.

Figure 10A:
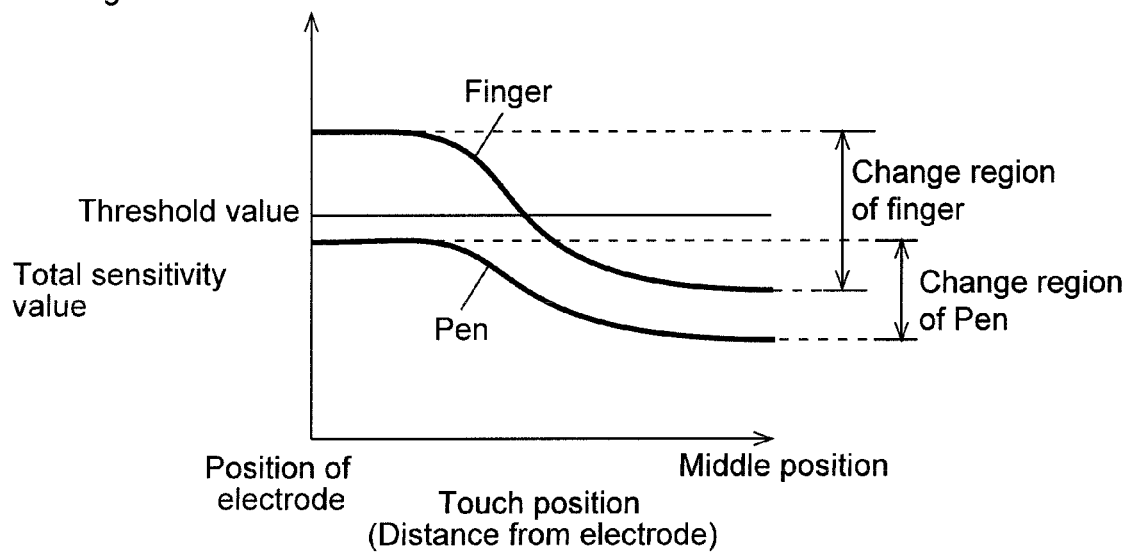
FIG. 10A is a diagram illustrating a state of change in a total sensitivity value according to a touch position.
Figure 10B:
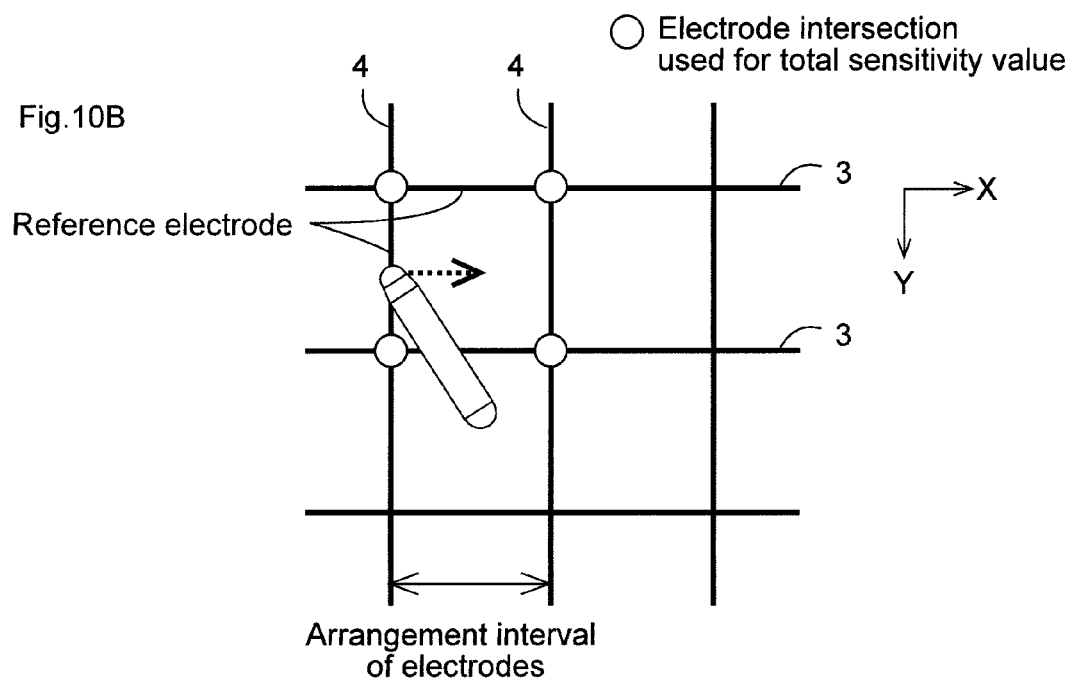
FIG. 10B is a diagram illustrating a process to obtain the state of change in the total sensitivity value.

FIG. 10A is a diagram illustrating states of change in a total sensitivity value according to a touch position with a pen P and a finger F, when the second sensitivity correction value according to this embodiment is not performed. FIG. 10B is a diagram illustrating a process to obtain the state of change in the total sensitivity value. As shown in FIG. 10B with a dotted arrow, while the pen P and the finger F are moved in a region from the transmitting electrode 3 as a reference (hereinafter, "reference transmitting electrode") and the reference receiving electrode 4 to an middle position, at predetermined intervals (1 mm), detection data of four electrode intersections are obtained, the sensitivity of each electrode intersection is obtained based on the detection data, and the total sensitivity value is obtained for each touch position by adding the sensitivities of the four electrode intersections. In this way, a diagram of a total sensitivity value as shown in FIG. 10A is obtained.

As shown in the diagram of FIG. 10A, regardless of whether a pen P or a finger F is used, the total sensitivity value is maximum at the touch position in the vicinity of the reference receiving electrode 4, decreases as the touch position moves away from the reference receiving electrode 4, abruptly decreases particularly in the middle region, and then remain unchanged. On the other hand, since a contact area on the touch surface with the pen P is different from that with the finger F, sensitivity is also different. In particular, an amount of change in the total sensitivity value is greater when the finger F is used, than when the pen P is used. Further, regions in which the total sensitivity value changes are different from each other between when the pen P is used and when the finger F is used. Accordingly, it is not possible to discriminate the pen from the finger F, by a single threshold value.

When the arrangement interval of the transmitting electrodes 3 and the receiving electrodes 4 is small, only a region in which the sensitivity is greater than the threshold value occurs with a use of finger F. Accordingly, the accuracy of the pointing device determining process is not reduced. On the other hand, when the arrangement interval of the transmitting electrodes 3 and the receiving electrodes 4 increases, a region in which the sensitivity is smaller than the threshold value also occurs with the use of the finger F. Accordingly, the accuracy of the pointing device determining process decreases.

Accordingly, in this embodiment, as described below in detail, the pointing device determiner 13 performs the second sensitivity correction process, which corrects the sensitivity obtained by the sensitivity calculator 11, according to a touch position obtained by the touch position detector 12. The pointing device determining process is performed based on the corrected sensitivity, which is obtained through the second sensitivity correction process.

FIG. 11 is a correction coefficient table, which is used in the second sensitivity correction process. FIG. 12 is a diagram illustrating a region in which correction coefficients are provided in the correction coefficient table. FIGS. 13A-13B are diagrams illustrating states of change in the total sensitivity value according to a touch position before and after the correction. FIG. 13C is a diagram illustrating a process to obtain the state of change in the total sensitivity value.

The pointing device determiner 13 corrects the total sensitivity value with reference to the correction coefficient table shown in FIG. 11. In the correction coefficient table, a correction coefficient (%) is set for each touch position. The correction of the total sensitivity value is performed by multiplying the correction coefficient corresponding to the touch position obtained by the touch position detector 12 by the total sensitivity value based on the actual measured value of sensitivity obtained by the sensitivity calculator 11.

In the correction coefficient table shown in FIG. 11, as shown in FIG. 12, the correction coefficients are set for touch positions provided at predetermined intervals in a region from the reference electrode intersection to the middle position between the reference electrode intersection and an adjacent electrode intersection in the x-axis direction and in the y-axis direction. In particular, in this embodiment, the arrangement interval of the transmitting electrodes 3 and the receiving electrodes 4 is 20 mm, and the correction coefficient is set every 1 mm in the region from the position (X0, Y0) of the electrode intersection and the middle position (X10, Y10).

As described above, the rectangular region including four electrode intersections, as corners, which are adjacent to each other in the x-axis direction and the y-axis direction is divided in half in the x-axis direction and is also divided in half in the y-axis direction, to obtain quarter regions. In the correction coefficient table, the correction coefficients are set only in the region I, which uses the electrode intersection N1 as a reference, among the quarter regions. However, when the touch position is in the region II, III or IV, the touch position is converted into a relative coordinate using the electrode intersection N2, N3 or N4 as a reference. By doing so, correction coefficients corresponding to all touch positions can be obtained, using the correction coefficient table provided only for the region I.

Further, in the correction coefficient table shown in FIG. 11, when the pen P is used, the characteristic as shown in FIG. 13A, in which the total sensitivity value decreases as the touch position moves away from the position (X0, Y0) of the reference electrode intersection in the x-axis direction and the y-axis direction, is converted into the characteristic as shown in FIG. 13B, in which the total sensitivity value is substantially constant, regardless of the touch position. At the position of the reference electrode intersection, the correction coefficient is 100, i.e., correction is not performed. The correction coefficient increases as the touch position moves away from the reference electrode intersection in the x-axis direction and in the y-axis direction.

In order to prepare the correction coefficient table as shown in FIG. 11, as shown in FIG. 13C, while the pen P is moved in the x-axis direction and in the y-axis direction at predetermined intervals (1 mm) from the reference electrode intersection, detection data of the four electrode intersections is obtained, and the sensitivity of each electrode intersection is obtained based on the detection data. Further, the total sensitivity value is obtained for each touch position by adding the obtained sensitivities. Thus, the diagram shown in FIG. 13A can be obtained. The total sensitivity value of each touch position actually measured is compared with the total sensitivity value at the position of the reference electrode intersection, and the correction coefficient is determined such that the total sensitivity value at each touch position is equal to the total sensitivity value at the position of the reference electrode intersection.

Figure 14:
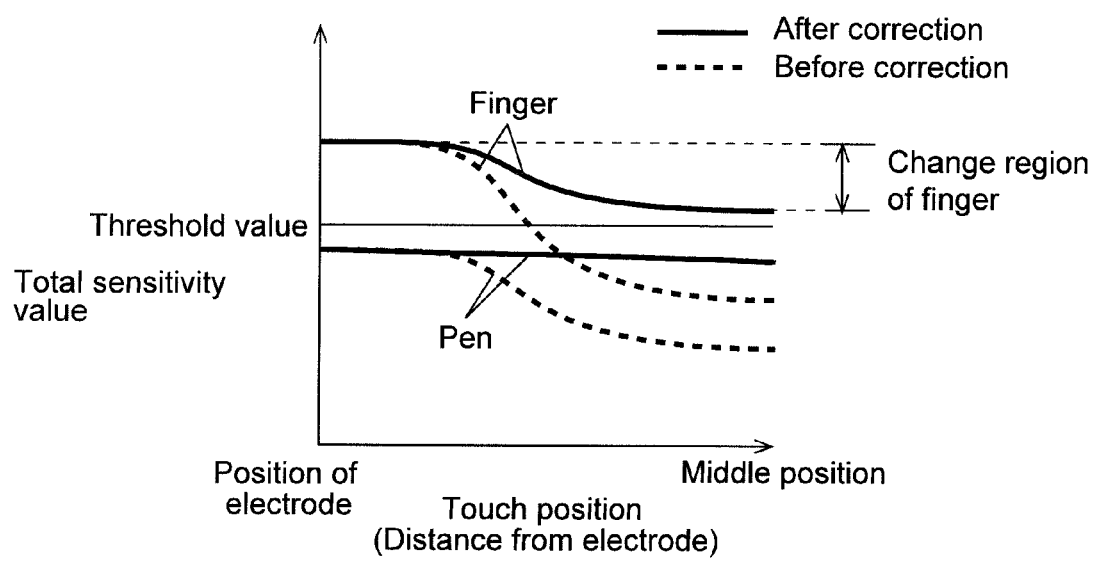
FIG. 14 is a diagram illustrating the states of change in the total sensitivity value according to the touch position before and after the correction.

FIG. 14 is a diagram illustrating states of change in the total sensitivity value according to the touch position (distance from an electrode) by a pen P or a finger F before and after the correction. When the total sensitivity value is corrected using the correction coefficients set in the correction coefficient table, and when a pen P is used, the total sensitivity value is corrected to be substantially constant, regardless of the touch position. On the other hand, when a finger F is used, the width of a region, in which the total sensitivity value varies, is decreased by the correction. Thus, regardless of the touch position, the total sensitivity value when the finger F is used is always greater than the total sensitivity value when the pen P is used, and does not overlap the total sensitivity value when the pen P is used. Accordingly, by setting an appropriate threshold value, the total sensitivity value is always smaller than the threshold value, when the pen P is used, and the total sensitivity value is always greater than the threshold value, when the finger F is used. Thus, it is possible to discriminate the pen P from the finger F, using a single threshold value.

Figure 15:
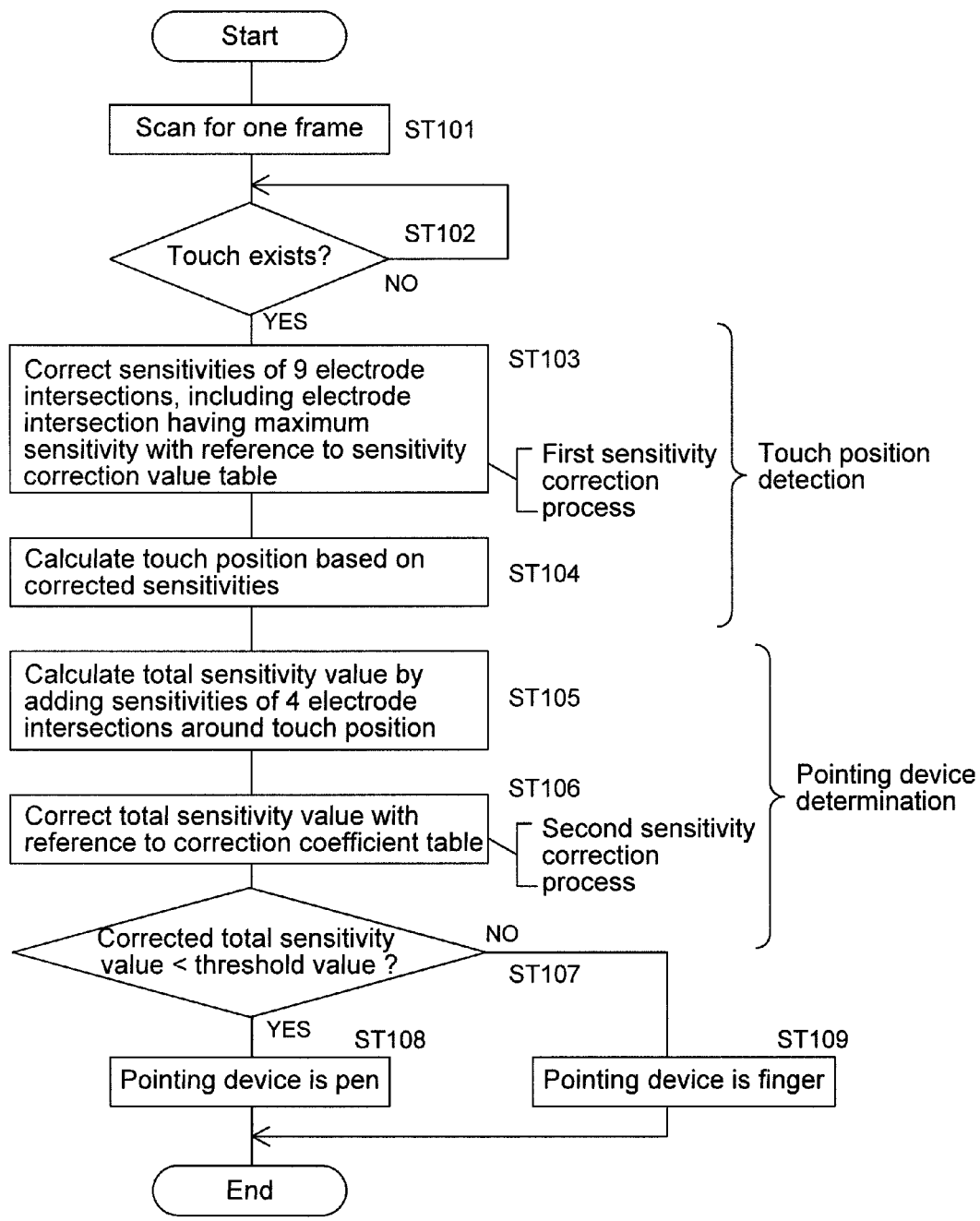
FIG. 15 is a flowchart illustrating steps of a process performed by a controller.

FIG. 15 is a flowchart illustrating steps of a process performed by a controller 8. First, scanning is performed for one frame (ST101) to obtain detection data of all electrode intersections. The sensitivity calculator 11 calculates a sensitivity of each electrode intersection, and determines whether or not there is a touch operation, based on the calculated sensitivities (ST102). When it is determined that there is a touch operation, the control proceeds to the touch position detection process, in which the touch position detector 12 performs the first sensitivity correction process, which corrects sensitivities of nine (9) electrode intersections, including the electrode intersection having the maximum sensitivity as a center, with reference to the sensitivity correction value table (ST103). The touch position is calculated based on the corrected sensitivities (ST104).

Next, the control proceeds to the pointing device determining process, in which the pointing device determiner 13, at first, calculates the total sensitivity value by adding the sensitivities of four electrode intersections around the touch position (ST105). Then, the second sensitivity correction process is performed, in which the total sensitivity value is corrected by multiplying the total sensitivity value by a correction coefficient corresponding to the touch position, with reference to the correction coefficient table (ST106). Then, it is determined whether or not the corrected total sensitivity value is smaller than the threshold value (ST107). When the corrected total sensitivity value is smaller than the threshold value, it is determined that the pointing device is a pen P, and a desired process, such as drawing, is performed using a property prepared for the pen P (ST108). On the other hand, when the corrected total sensitivity value is greater than the threshold value, it is determined that the pointing device is a finger F, and a desired process, such a drawing, is performed using a property prepared for the finger F (ST109).

In this embodiment, the pointing device determiner 13 determines the pointing device based on the total sensitivity value obtained by adding sensitivities of multiple electrode intersections positioned around the touch position, and the total sensitivity value is obtained from the actual measured value of the sensitivity obtained by the sensitivity calculator 11. However, it is possible to obtain the total sensitivity value from the corrected value of sensitivity obtained by the first sensitivity correction process, which is performed by the touch position detector 12 to improve the accuracy of the touch position detection process.

Further, in this embodiment, the pointing device determiner 13 determines the pointing device, based on the total sensitivity value obtained by adding the sensitivities of multiple electrode intersections positioned around the touch position. However, the pointing device may be determined based on an average of the sensitivities of multiple electrode intersections.

According to the touch screen device of the embodiment of the present invention, even when the arrangement interval of electrodes is large, the accuracy of the pointing device determination process, which determines whether the pointing device used in a touch operation is a pen or a finger, is secured. Thus, it is useful as a touch screen device that determines a pointing device.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A touch screen device comprising:
   a panel body having electrodes arranged in a grid pattern;
   a sensitivity calculator configured to calculate a sensitivity for each electrode intersection based on an amount of change in a signal output from the electrodes in response to a touch operation;
   a touch position detector configured to detect the touch position based on the sensitivity obtained by the sensitivity calculator; and
   a pointing device determiner configured to correct the sensitivity obtained by the sensitivity calculator, based on the touch position obtained by the touch position detector, and to determine whether a pointing device performing the touch operation is a pen or a finger, based on the corrected sensitivity.

2. The touch screen device according to claim 1, wherein the pointing device determiner corrects the sensitivity by multiplying the sensitivity by a correction coefficient corresponding to the touch position obtained by the touch position detector.

3. The touch screen device according to claim 2, wherein the pointing device determiner uses a correction coefficient table in which a correction coefficient is set for each touch position.

4. The touch screen device according to claim 3, wherein correction coefficient is a percentage value.

5. The touch screen device according to claim 1, wherein the pointing device determiner obtains a total sensitivity value by adding sensitivities of a plurality of electrode intersections positioned around the touch position obtained by the touch position detector.

6. The touch screen device according to claim 5, wherein the pointing device determiner adds sensitivities of four electrode intersections.

7. The touch screen device according to claim 5, wherein the pointing device determiner compares the total sensitivity value with a threshold value.

8. The touch screen device according to claim 7, wherein the pointing device determiner determines that the pointing device is a finger when the total sensitivity value is greater than the threshold value.

9. The touch screen device according to claim 7, wherein the pointing device determiner determines that the pointing device is a pen when the total sensitivity value is smaller than the threshold value.

10. The touch screen device according to claim 5, wherein the pointing device determiner corrects the total sensitivity value, such that the total sensitivity value is substantially constant, regardless of the touch position, when the pointing device is the pen.

11. The touch screen device according to claim 1, wherein the touch position detector corrects the sensitivity.

12. The touch screen device according to claim 11, wherein the touch position detector corrects the sensitivity, such that the sensitivity varies substantially linearly according to the touch position over an entire region between two adjacent electrodes, and calculates the touch position based on the corrected sensitivity.

13. The touch screen device according to claim 11, wherein the touch position detector corrects the sensitivity uses a sensitivity correction value table in which a correction value is set for each value of sensitivity.

14. The touch screen device according to claim 1, wherein the touch position detector corrects sensitivities of some of the electrode intersections.

15. The touch screen device according to claim 1, wherein the touch position detector corrects sensitivities of nine electrode intersections.

16. The touch screen device according to claim 1, wherein the pen and the finger each have mutually different properties assigned thereto.

17. The touch screen device according to claim 11, wherein the touch position detector corrects the sensitivity based upon sensitivities of a plurality of electrode intersections, which include the electrode intersections utilized by the pointing device determiner.

18. The touch screen device according to claim 3, wherein the correction coefficient table contains correction coefficients only for a region defined by half of a distance between adjacent electrodes, in each orthogonal direction of the grid pattern.

19. The touch screen device according to claim 5, wherein the pointing device determiner corrects the total sensitivity value such that a region in which the total sensitivity value varies is decreased, when the pointing device is a finger.

20. The touch screen device according to claim 5, wherein the pointing device determiner corrects the total sensitivity such that when a finger is utilized as the pointing device, the total sensitivity is always greater than when a pointer is used as the pointing device.

* * * * *